United States Patent
Banaszak et al.

(10) Patent No.: US 11,113,464 B2
(45) Date of Patent: *Sep. 7, 2021

(54) SYNCHRONIZING DATA-ENTRY FIELDS WITH CORRESPONDING IMAGE REGIONS

(71) Applicant: Equifax Inc., Atlanta, GA (US)

(72) Inventors: Marcin Banaszak, Dublin (IE); Telmo Pestana, Dublin (IE); Niall Fallon, Dublin (IE); Georgia Klontza, Dublin (IE)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,560

(22) Filed: Aug. 28, 2020

(65) Prior Publication Data

US 2020/0394357 A1 Dec. 17, 2020

Related U.S. Application Data

(63) Continuation of application No. 16/615,761, filed as application No. PCT/US2018/052789 on Sep. 26, 2018, now Pat. No. 10,789,422.

(Continued)

(51) Int. Cl.
*G06F 40/174* (2020.01)
*G06K 9/00* (2006.01)
*G06K 9/32* (2006.01)

(52) U.S. Cl.
CPC ....... *G06F 40/174* (2020.01); *G06K 9/00442* (2013.01); *G06K 9/00993* (2013.01); *G06K 9/3233* (2013.01); *G06K 2209/01* (2013.01)

(58) Field of Classification Search
CPC .................................................. G06F 40/174
See application file for complete search history.

(56) References Cited

U.S. PATENT DOCUMENTS 9,117,118 B1 * 8/2015 Lewis ................ H04N 1/00761
10,481,776 B2 * 11/2019 Kato ................... G06F 3/04883
(Continued)

FOREIGN PATENT DOCUMENTS

JP 2011060115 A 3/2011

OTHER PUBLICATIONS

U.S. Appl. No. 16/615,761, "Non-Final Office Action", dated Mar. 24, 2020, 9 pages.
(Continued)

*Primary Examiner* — Asher D Kells
(74) *Attorney, Agent, or Firm* — Kilpatrick Townsend & Stockton LLP

(57) ABSTRACT

According to certain implementations, a data-entry system synchronizes a region of an image with a data-entry field. For example, a data-entry interface may include data-entry fields. The data-entry interface may be updated to display an image of a document, such as a scanned handwritten form. The document image may include regions that are associated with respective data-entry fields. The data-entry system may detect a selection of a target data-entry field. Based on the detected selection, the data-entry system may determine an associated region of the document image. The associated region may correspond to the target data-entry field. The data-entry system may modify the displayed document image, and the modification may include a visual enhancement of the associated region. In some cases, the data-entry system determines the associated region corresponding to the target data-entry field based on metadata.

20 Claims, 7 Drawing Sheets

Related U.S. Application Data

(60) Provisional application No. 62/564,002, filed on Sep. 27, 2017.

(56) References Cited

U.S. PATENT DOCUMENTS

| | | | |
|---|---|---|---|
| 2004/0181749 A1* | 9/2004 | Chellapilla | G06K 9/00449 715/222 |
| 2008/0028289 A1 | 1/2008 | Hicks et al. | |
| 2008/0270884 A1* | 10/2008 | Rehm | G06F 3/0482 715/224 |
| 2009/0109455 A1 | 4/2009 | Smith et al. | |
| 2009/0119574 A1 | 5/2009 | Gitlin et al. | |
| 2011/0093807 A1 | 4/2011 | Dunn et al. | |
| 2012/0159391 A1 | 6/2012 | Berry et al. | |
| 2012/0240038 A1 | 9/2012 | Curtis | |
| 2013/0097479 A1* | 4/2013 | Zavaleta | G06F 40/174 715/222 |
| 2013/0205189 A1* | 8/2013 | DiPierro | G06F 3/0483 715/224 |
| 2014/0258838 A1 | 9/2014 | Evers et al. | |
| 2014/0346222 A1 | 11/2014 | Mastykarz | |
| 2014/0372860 A1 | 12/2014 | Craven et al. | |
| 2015/0019413 A1 | 1/2015 | Lazarus | |
| 2015/0178252 A1 | 6/2015 | Dunn et al. | |
| 2015/0363376 A1 | 12/2015 | Anderson et al. | |
| 2016/0012030 A1* | 1/2016 | Tran | G06F 40/174 715/222 |
| 2016/0335494 A1* | 11/2016 | Ho | G06K 9/00456 |
| 2017/0010761 A1 | 1/2017 | Patel et al. | |
| 2018/0174243 A1 | 6/2018 | Mishra | |
| 2018/0225038 A1 | 8/2018 | Kennedy | |
| 2018/0349556 A1 | 12/2018 | Owen | |
| 2019/0073348 A1* | 3/2019 | Cheesman | G06F 40/174 |
| 2020/0380202 A1* | 12/2020 | Cass | G06F 16/93 |

OTHER PUBLICATIONS

U.S. Appl. No. 16/615,761, "Notice of Allowance", dated Jun. 1, 2020, 6 pages.
PCT/US2018/052789, "International Preliminary Report on Patentability", dated Apr. 9, 2020, 7 pages.
PCT/US2018/052789, "International Search Report and Written Opinion", dated Mar. 4, 2019, 10 pages.
EP18863373.9, "Extended European Search Report", dated May 14, 2021, 7 pages.

* cited by examiner

METADATA 140

FIELD DEFINITION 410

```
fields: [{
  name: 'jobTitle',
  label: 'Position/Title',
  type: 'text',
  coords: [{
    x: 1287,
    y: 1475
  }, {
    x: 1913,
    y: 1667
  }]
}]
```

INTERFACE FIELD CONFIGURATION 450

```
<efx-text-field label="Position/Title", (onFocus)="createOutlineCommand('jobTitle')"></efx-text-field>
```

FIG. 4

SYNCHRONIZING DATA-ENTRY FIELDS WITH CORRESPONDING IMAGE REGIONS

CROSS-REFERENCES TO RELATED APPLICATIONS

This application is a continuation of U.S. non-provisional application Ser. No. 16/615,761 entitled "SYNCHRONIZING DATA-ENTRY FIELDS WITH CORRESPONDING IMAGE REGIONS," filed Sep. 26, 2018, which is the National Stage of International Application No. PCT/US2018/052789, filed Sep. 26, 2018, which claims the benefit of U.S. provisional application Ser. No. 62/564,002, filed Sep. 27, 2017. The entire disclosures of all these applications (including all attached documents) are incorporated by reference in their entireties for all purposes.

TECHNICAL FIELD

This disclosure relates generally to the field of human-machine interfaces, and more specifically relates to automatic synchronization of multiple portions of a user interface.

BACKGROUND

A company may receive information written on paper forms. A person providing the information, such as a customer or an employee, may have filled out the form by hand as part of a job application, to sign up for a service, or for any other suitable purpose. In order to respond to the person (e.g., to provide the requested service), the company may transfer the information on the handwritten form to a computer system of the company. Existing techniques for transferring the handwritten information may be labor-intensive or prone to error. A need exists to provide techniques to improve the speed and accuracy of transferring information on a handwritten form to a computer system.

Attempts to address this need may include using optical character recognition ("OCR") on an image of the handwritten form. A computer system may apply OCR to a handwritten form to attempt to digitally transcribe information written on the form, but due to wide variations in handwriting skills and styles, the output of OCR techniques may be unreliable and prone to error. In addition, a specialist in data entry may manually transcribe the information, such as by viewing an image of the form and typing the handwritten information into a data-entry interface. A data-entry specialist transcribing the information may need to spend time interpreting the handwritten form, such as by using a mouse to move or zoom the image to an appropriate area, and by using a keyboard to type the information into the interface. The specialist's actions to move or zoom the image may increase the amount of time for the information to be transferred to the computer system of the company.

SUMMARY

According to certain implementations, a data-entry system synchronizes a region of an image with a data-entry field. For example, a data-entry interface may include data-entry fields. The data-entry interface may be updated to display an image of a document, such as a scanned handwritten form. The document image may include regions that are associated with respective data-entry fields. The data-entry system may detect a selection of a target data-entry field. Based on the detected selection, the data-entry system may determine an associated region of the document image. The associated region may correspond to the target data-entry field. The data-entry system may modify the displayed document image, and the modification may include a visual enhancement of the associated region. In some cases, the data-entry system determines the associated region corresponding to the target data-entry field based on metadata.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features and aspects of the present disclosure are better understood when the following Detailed Description is read with reference to the accompanying drawings, where:

FIG. 4 is a diagram depicting examples of metadata, executable by the data-entry system of FIG. 1, that can indicate an association between a data-entry field and an image region, according to certain aspects;

DETAILED DESCRIPTION OF THE INVENTION

Figure 1:
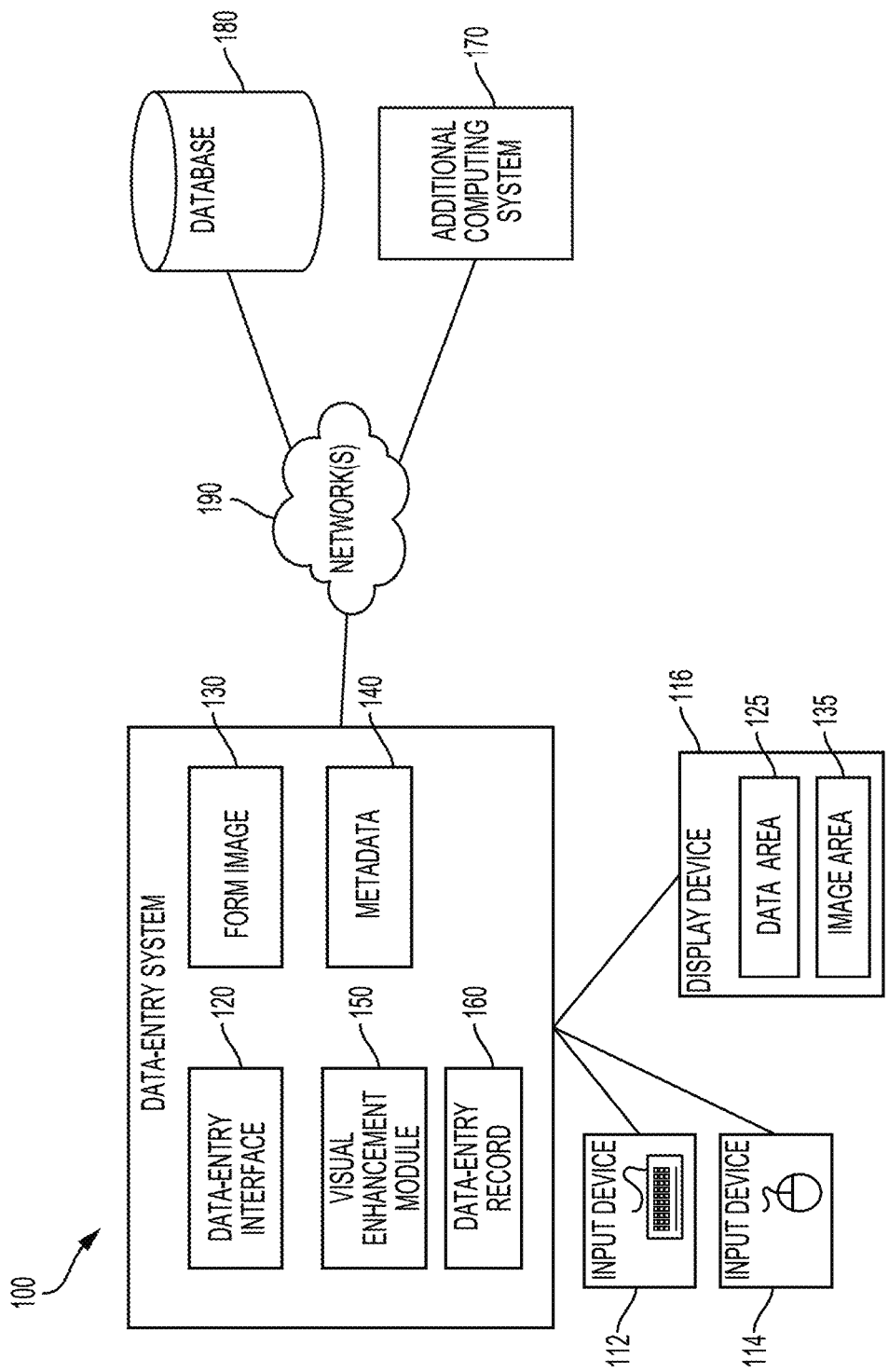
FIG. 1 is a diagram depicting an example of a system in which a data-entry system synchronizes a data-entry field with a region of an image, according to certain aspects.

Aspects are disclosed for synchronizing a data-entry computer interface with regions of an image of a form. A data-entry system may display a data-entry interface and an image of a form. The data-entry system may use metadata to associate a field of the data-entry interface with a region of the image. A data-entry specialist may select a focused field of the data-entry interface using inputs to an input device, such as keystrokes on a keyboard. Based on the metadata, the data-entry system may display a visual enhancement (e.g., highlighting) of a region of the image associated with the focused field. Responsive to receiving an additional selection of an additional focused field, the data-entry system may apply the visual enhancement to a different image region that is associated with the additional focused field. The data-entry specialist may perform the additional selections using the same input device, such as by using keystrokes of a "tab" key to quickly progress through the fields of the data-entry interface while keeping his or her own gaze on the enhanced regions of the image.

One or more features described herein can improve techniques related to automated transcription of handwritten information to a computerized data system. An existing data-entry computer system may use automated OCR to transcribe information written on a handwritten form, or a digital image of a handwritten form. Using OCR may be inadequate for interpreting handwritten information, and may introduce many errors into the output results. A data-entry specialist may review the results of OCR before the information is transferred to the computer system. However, correction of errors introduced by automated OCR may take more time than manually transcribing the information. A synchronized data-entry interface may improve the speed by which errors introduced by automated OCR may be corrected.

Some existing data-entry computer systems may provide a user interface for transcribing handwritten information to a computerized data system. For example, existing data-entry systems may display an image of a form, such that the image does not include any visual enhancements. A data-entry specialist transcribing the unenhanced image can manually find an image region of interest, such as by moving the image, via a mouse, to view a region of the image that includes the information being transcribed. Alternatively, the data-entry specialist may view a region of the unenhanced image, while moving the data-entry fields to find the field corresponding to the viewed region. However, the data-entry specialist may use many excess or repetitive motions to transcribe each piece of information on the form, such as scrolling up and down the data-entry fields or the unenhanced image, zooming in and out on an unenhanced image region, changing gaze between the unenhanced image and the data-entry fields, or other motions. A synchronized data-entry interface may improve accuracy of transcribing handwritten information, such as by presenting image data from the form in an enhanced manner, or by presenting image data from the form that is synchronized with an associated data-entry field. In addition, a synchronized data-entry interface may improve the health and well-being of data-entry specialists who use the synchronized interface, such as by automatically presenting image data from the form in a synchronized visual state.

Techniques for synchronizing a data-entry interface with an image of a form can more effectively transfer data from scanned images of hand-written forms to electronic data systems. For example, synchronizing a data-entry field with a visually enhanced image region can reduce motions used to view the image region associated with the data-entry field. Reducing motions can decrease the occurrence or severity of eyestrain, ergonomic concerns, or repetitive stress injuries experienced by data-entry specialists. Furthermore, synchronizing a data-entry interface with an image of a form can improve workflow of data-entry specialists, such as by reducing the time used to find the image region of interest, to change between different input devices (e.g., moving hands between keyboard and mouse), or to correct errors caused by the excess motions (e.g., after using a mouse, accidentally placing fingers on the wrong "home keys" of a keyboard). In addition, synchronizing a data-entry interface with a visually enhanced image of a form can improve a rate and an accuracy of transcription. For example, a data-entry specialist may more clearly see and understand information included in an image region that is enhanced by highlighting and zooming in on the region.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a diagram depicting an example of a system 100 that can synchronize a data-entry field with a region of an image. In system 100, a data-entry system 110 can provide display data to a display device 116. In some aspects, the data-entry system 110 can receive input from one or more input devices 112 and 114. For example, the input device 112 can be a computer keyboard and the input device 114 can be a computer mouse. In some aspects, data-entry system 110 receives input from additional input devices, such as a microphone or touchpad, or from the display device 116, such as via a touchscreen.

In some aspects, the data-entry system 110 can communicate with additional components of system 100, such as one or more databases 180 or one or more additional computing systems 170. The data-entry system 110 can communicate with the database 180 or the additional computing system 170 via one or more networks 190. Examples of suitable networks include the Internet, a personal area network, a local area network, a wide area network, or a wireless local area network. A wireless network may include a wireless interface or combination of wireless interfaces. A wired network may include a wired interface. The wired or wireless networks may be implemented using routers, access points, bridges, gateways, or the like, to connect components of the system 100 via the network 190. In some aspects, the data-entry system 110 can receive or provide data to one or more of the input device 112, the input device 114, and the display device 116 via the network 190.

The data-entry system 110 can receive a form image 130, such as from the database 180, the additional computing system 170, or storage local to the data-entry system 110. In additional aspects, the data-entry system 110 can generate the form image 130, such as by scanning a paper including the handwritten form. The form image 130 includes digital graphical information, such as a digitally scanned image or a digital photograph, which represents the appearance of the handwritten form and any information written on the form. In some aspects, the handwritten form can be a physical document that has information added by a person, including a paper document printed from an electronic file. The person may fill out the handwritten form using pen, pencil, or other writing implement, or using a printing device, such as a typewriter. In some aspects, the handwritten form is filled out by the person using electronic means, such as via a computer, and subsequently printed out onto paper, such as to receive a handwritten signature.

In additional aspects, the data-entry system 110 can receive metadata 140, such as from the database 180, the additional computing system 170, or storage local to the data-entry system 110. The metadata 140 can be associated with the form image 130, and can include information about the form image 130. For example, the metadata 140 can include one or more labels, each label corresponding to an area of the paper form on which information is written (e.g., "name," "address," "job title," "signature"). In addition, the metadata 140 can include one or more sets of coordinates, each coordinate set corresponding to a region of the form image 130. In additional aspects, the metadata 140 can include additional information about the form image 130, such as an identifier of the handwritten form on which the form image 130 is based, a data type associated with a label, or other suitable information.

In some aspects, the data-entry system 110 can provide a data-entry interface 120. For example, the data-entry system 110 can generate the data-entry interface 120 based on information included in the metadata 140. Additionally or alternatively, the data-entry system 110 can receive information (e.g., a template, a pre-generated interface) associated with the form image 130 and generate the data-entry interface 120 based on the received information. The data-entry system 110 can provide graphical information describing the data-entry interface 120 to a display device 116. Based on the received information, the display device 116 can display one or more areas of the data-entry interface 120. For example, the display device 116 can display a data area 125 including one or more data-entry fields, such as text boxes that can receive typed information. Additionally or alternatively, the display device 116 can display an image area 135 including part or all of an image, such as the form image 130.

In additional aspects, the data-entry system 110 may associate the data-entry interface 120 (or areas of the interface) with the form image 130. For example, based on the metadata 140, the data-entry system 110 can associate a data-entry field that is included in the data-entry interface 120 with a region of the form image 130. The data area 125 can include the data-entry field, and the image area 135 can include the associated image region. In some aspects, the data-entry system 110 can determine a selection of a data-entry field via an input received from an input device, such as a keystroke received from the input device 112. For example, a data-entry specialist can enter a "tab" keystroke using the input device 112. In response to receiving the tab keystroke, the data-entry system 110 can determine that the data-entry specialist has selected one of the data-entry fields. Additionally or alternatively, in response to receiving the tab keystroke, the data-entry system 110 can display the selected data-entry field in the data area 125, and the associated image region in the image area 135.

In additional aspects, the data-entry system 110 can visually enhance the image region that is associated with the selected data-entry field. For example, responsive to a selection of a data-entry field, the data-entry system 110 can visually enhance the associated image region displayed in the image area 135. A visual enhancement may include graphical data that is applied to a particular image region displayed in an image area. The graphical data may cause the particular image region to be displayed differently (e.g., with a different appearance) from other image regions that are displayed in the image area. Examples of visual enhancements include (without limitation) zooming or panning the form image 130 such that the associated image region is centrally displayed in the image area 135, or applying a highlighting enhancement to the associated image region. In some cases, the form image 130 is modified by the visual enhancement, such that the modified form image includes the graphical data for the visual enhancement. In addition, the visual enhancement is displayed in addition to the form image 130, such that the image area 135 displays a combination of the form image 130 and the graphical data for the visual enhancement.

In system 100, a data-entry specialist can use a single input device to navigate and enter information into the data-entry interface 120. For example, the data-entry system 110 can receive, from the input device 112, inputs that include navigation commands of the data-entry interface 120. Responsive to receiving a tab keystroke, the data-entry system 110 can determine a selection of a data-entry field. Responsive to determining the selection, the data-entry system 110 can display the selected data-entry field in the data area 125 and display the associated image region in the image area 135. The data-entry system 110 can receive additional inputs including additional navigation commands. For example, responsive to receiving an additional tab keystroke, the data-entry system 110 can determine that an additional data-entry field has been selected, and can display the additional data-entry field in the data area 125, with an additional associated image region in the image area 135. Responsive to receiving further additional tab keystrokes, the data-entry system 110 can determine further selections, and display further data-entry fields and associated image regions. In some aspects, responsive to receiving each navigation command (e.g., each tab keystroke), the data-entry system 110 selects a subsequent data-entry field and deselects a previously selected data-entry field, such that only a single data-entry field is selected at a point in time.

The data-entry system 110 can receive additional inputs that include text information, such as alphanumeric keystrokes describing the information included in the associated image region. In some aspects, the data-entry system 110 can perform operations related to storing the text information. For example, as the data-entry specialist types information from the handwritten form into a selected data-entry field, the data-entry system 110 can store the typed information in a data-entry record 160. The data-entry system 110 can locally store the data-entry record 160, or provide the data-entry record 160 to other components of the system 100, such as to the database 180 or the additional computing system 170.

Although the example system 100 depicted by FIG. 1 is described as receiving keystroke inputs from a keyboard (e.g., the input device 112), additional example systems may use additional input types. For example, an additional data-entry system can receive button inputs from a mouse, such that selection of a data-entry field and text input into the data-entry field are performed using the inputs from the mouse (e.g., selection via button click, text input via button clicks on an on-screen keyboard). Furthermore, an additional data-entry system can receive a spoken inputs via a microphone, such that selection of a data-entry field is performed using a spoken command received by the microphone (e.g., "next field") and text input is performed by spoken information received by the microphone. Additional input types are envisioned. In such configurations, the additional data-entry systems can display or visually enhance the image region associated with the data-entry field selected via the additional input devices.

In some aspects, the data-entry interface 120 can improve one or both of work flow and working conditions for data-entry specialists. A data-entry specialist using an interface that does not synchronize data-entry fields with corresponding image regions may use different input devices to interact with the non-synchronized interface. For example, the data-entry specialist may use a keyboard to type in the information, and a mouse or touchscreen to focus the viewable area of the scanned image on the relevant information. In addition, the data-entry specialist may use multiple display areas, such as an area displaying the scanned image and another area displaying the data-entry interface. A data-entry specialist may transcribe dozens or hundreds of handwritten forms each day. Using a non-synchronized interface, data-entry specialists may switch between input devices or change gaze between display areas many times for each form. In addition, the handwritten form may have the necessary information written in very poor or small handwriting, resulting in the data-entry specialist using an input device to zoom in or out on the scanned image repeatedly, or else risk inaccurate transcription. Switching between input devices and display areas repeatedly may lead to repetitive stress injury, eyestrain, neck or back injury, or other physical injuries for the data-entry specialist. Furthermore, the use of multiple input devices and display areas may reduce the data-entry specialist's work flow, leading to slower transcription times or increased error rates in the transcribed data.

Figure 2:
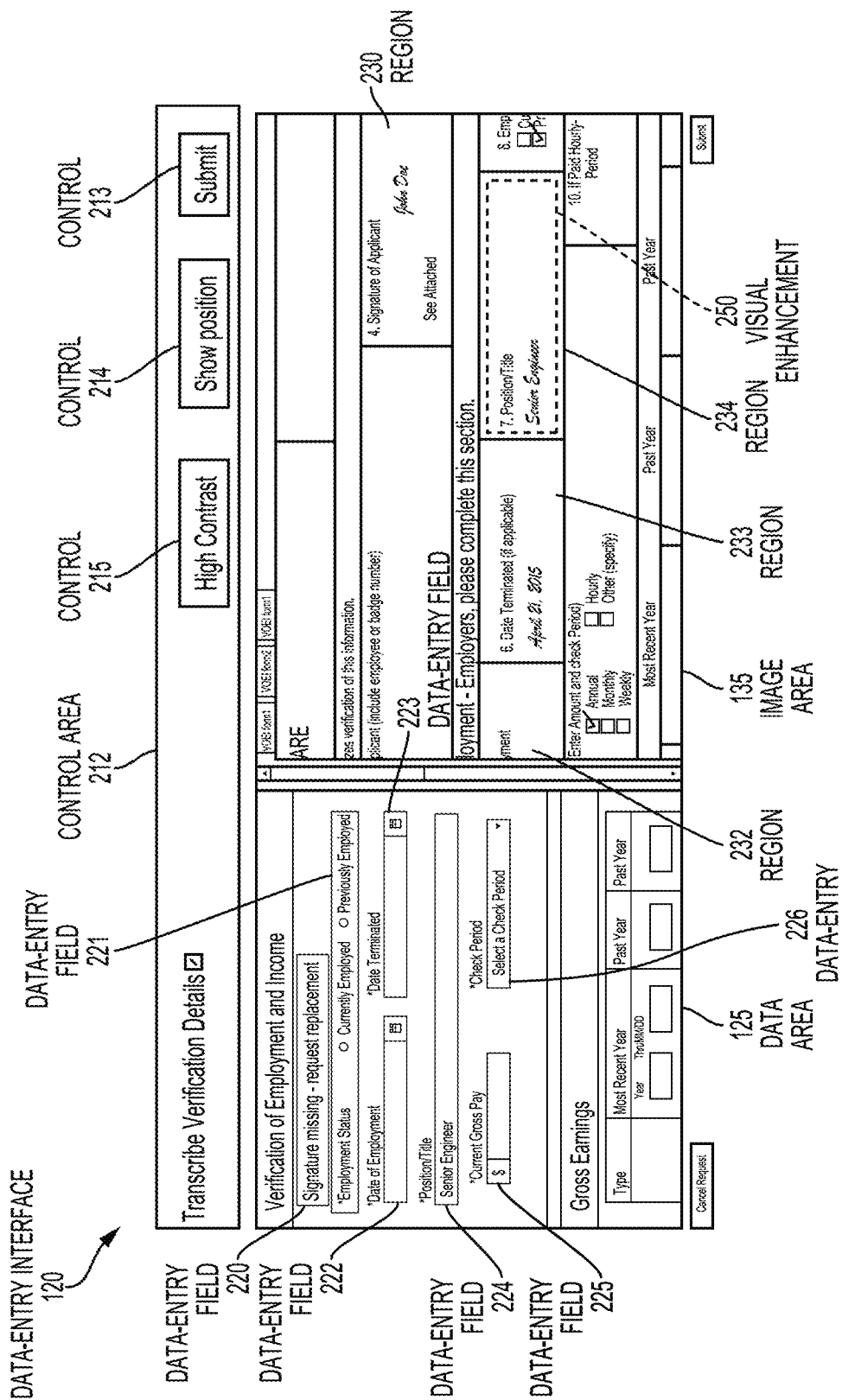
FIG. 2 is a diagram depicting an example of a data-entry interface provided by the data-entry system of FIG. 1, which is capable of receiving inputs to a data-entry field and displaying a synchronized region of an image, according to certain aspects.

FIG. 2 is a diagram depicting an example of a synchronized data-entry interface, such as the data-entry interface 120 provided by data-entry system 110. The data-entry system 110 can provide data, such as a digital signal including graphical data, to the display device 116. The data-entry interface 120 can include multiple areas, such as the data area 125, the image area 135, a control area 212, or any other suitable interface area. The control area 212 can include settings or controls related to the data-entry interface 120. For example, the control area 212 can include a control 213 to submit information entered into a data-entry field, a control 214 to apply a visual enhancement to a currently selected image region, a control 215 to apply an additional visual enhancement to the image displayed in image area 135. In addition, the control area 212 can include (without limitation) controls related to modifying other interface areas, adjusting a visual enhancement of the image area 135, selecting a new form, requesting help (e.g., from a coworker of a user of the data-entry interface 120), or any other suitable control or setting.

In some aspects, the data-entry system 110 can display the multiple areas on a single display device, such as on respective areas on a display screen. In additional aspects, the data-entry system 110 can display the areas data-entry interface 120 on multiple components of a display device, such as on side-by-side monitors. For example, the data-entry system 110 can display the data area 125 a on a first display screen and the image area 135 on a second display screen. In some cases, the data-entry system 110 displays a restrained set of data, such as by presenting a currently selected image region of a current form and a data-entry field associated with the currently selected image region. In addition, the restrained set of data may omit data that is unassociated with the current form, such as by not displaying image regions from additional forms.

The data area 125 can include one or more data-entry fields, including data-entry fields 220 through 226. The image area 135 can include one or more image regions associated with the data-entry fields included in the data area 125. For example, the image area 135 includes region 230 associated with data-entry field 220, region 232 associated with data-entry field 222, region 233 associated with data-entry field 223, and region 234 associated with data-entry field 224. In some aspects, the data-entry interface 120 is presented in a synchronized state, such as by displaying a region that is associated with a selected data-entry field. In some cases, additional image regions associated with additional data-entry fields are available to the data-entry interface 120 without being displayed in the image area 135. For example, if the image area 135 displays a portion of the form image 130, additional image regions may be associated with the remainder of the form image 130 (e.g., the remaining portions of the image not currently visible in the image area). Modifying the information visible in the image area 135 may make the additional image regions visible, such as if an associated data-entry field is selected. In some aspects, a user of the data-entry interface 120 can manually modify the visible information, such as by providing inputs, by any suitable input device, to adjust the displayed portion of the form image 130. In some aspects, the data-entry system 110 determines an association between a data-entry field and an image region, or a visual enhancement of the image region, based on metadata, such as metadata 140.

In some aspects, the data-entry system 110 can determine a selection of one of the data-entry fields 220 through 226 in response to a received input, such as an input received by input device 112. The data-entry system 110 can interpret a type of received input (e.g., a tab keystroke) as a navigation command. Responsive to determining the selected data-entry field, the data-entry system 110 can perform operations modifying the display of an image in the image area 135. For example, the performed operations can modify the display in the image area 135 such that the image area 135 displays the image region associated with the selected data-entry field. Additionally or alternatively, the performed operations can modify the displayed image area 135 such that the associated image region is visually enhanced. Responsive to receiving one or more navigation commands, the data-entry system 110 can select additional data-entry fields, such as to allow user to progress between the data-entry fields 220 through 226. In additional aspects, the data-entry system 110 can interpret an additional type of received input as an additional navigation command. For example, responsive to receiving a "shift+tab" keystroke (e.g., input representing a shift key and a tab key held down together), the data-entry system 110 can select a previous data-entry field and display the associated image region in the image area 135, such as to allow a user to go back to a data-entry field that they had previously selected. In additional aspects, the data-entry system 110 can interpret one or more additional types of received input (e.g., alphanumeric keystrokes, an enter keystroke, a space bar keystroke) as informational inputs for the selected data-entry field. In some cases, a data-entry field or an image region is accessed via a particular manner of interaction with the data-entry interface 120. For example, the display in the image area 135 may be modified in response to a selection of one of the data-entry fields 220 through 226, such as a modification to display a region 230 in response to a selection of the associated data-entry field 220. In addition, the selected data-entry field may be modified based on an interaction with the image area 135, such as by selecting the data-entry field 220 in response to an interaction with (e.g., a mouse click) the associated region 230. Synchronizing the displayed image region with the selected data-entry field may improve the speed and accuracy of transcription, or reduce excess motions of a data-entry specialist who is transcribing the data.

In some aspects, the data-entry interface 120 can apply one or more visual enhancements to an image region associated with a selected data-entry field. For example, data-entry system 110 receives a selection of data-entry field 224. Responsive to a determination that data-entry field 224 has been selected, the data-entry interface 120 displays the associated region 234 in the image area 135. For example, the data-entry interface 120 may display the form image 130 such that region 234 is approximately centered in the image area 135. Additionally or alternatively, the form image 130 can be scaled (e.g., zoomed in, zoomed out) such that the reason 234 occupies a portion of the image area 135 (e.g., occupies 80% of the width of the image area 135). In additional aspects, the data-entry interface 120 applies a visual enhancement 250 to the region 234. As an example, and not by way of limitation, the visual enhancement 250 is depicted as an outline that indicates the edges of the region 234. Responsive to receiving a selection of an additional data-entry field (e.g., receiving an input navigating to data-entry field 223), the data-entry interface 120 can display region 234 without the visual enhancement 250, and the additional image region (e.g., region 233) associated with the additional data-entry field can be displayed with an additional visual enhancement. In some aspects, the data-entry interface 120 can apply the visual enhancement (or an additional visual enhancement) in response to an input to a control, such as to a "show position" control 214, or a "high contrast" control 215. Displaying an image region with a visual enhancement may improve speed or accuracy of transcription of information included in the region. For example, a data-entry specialist may use a visual enhancement to quickly locate the region that is associated with the selected data-entry field, or to improve the legibility of handwritten information displayed in the region.

Visual enhancements, such as the visual enhancement 250, can include graphical information suitable to be displayed with the image region. For example, visual enhancements can include one or more of displaying the region in a particular area of the image area 135 (e.g., centered); scaling the region within the image area 135 (e.g., zooming in or out); applying a visual indicator to the region, such as an outline, a pattern, a color, a highlighting, or any other suitable visual indicator; applying a mask to regions outside of the selected region; applying a visual modification to the displayed image, such as a high-contrast modification, a color inversion (e.g. black and white colors are inverted to display as white and black), or any other suitable modification. A visual enhancement can vary over time, such as a visual enhancement that blinks on or off, or that is displayed in response to an input (e.g., a "show position" command). In some aspects, the visual enhancement 250 is an additional image that is displayed concurrently with the form image 130 within the image area 135. Additionally or alternatively, the data-entry system 110 (or the additional computing system 170) modifies the form image 130 to include the visual enhancement 250.

In additional aspects, the data-entry interface 120 can apply multiple visual enhancements to an image region. Additionally or alternatively, the data-entry interface 120 can apply one or more of the visual enhancements based on an informational input entered into the associated data-entry field. For example, responsive to a selection of a data-entry field including one or more form options (e.g., a checkbox, a menu, a radio button), the data-entry interface 120 can apply a first visual enhancement, such as an outline, to the image region associated with the selected data-entry field. Responsive to receiving an informational input to the data-entry field, such as an input choosing one or more of the options, the data-entry interface 120 can apply a second visual enhancement, such as a highlighting in a sub-region (e.g., the text on the form) corresponding to the selected options. Application of the multiple visual enhancements may allow a data-entry specialist to quickly verify his or her inputs to the data-entry field, such as by visually enhancing selected items in a list of multiple checkboxes.

In some aspects, the data area 125 may include data-entry fields that can receive various types of inputs from a particular input device. For example, the data-entry fields 220 through 226 can receive various types of keystrokes from the input device 112. Responsive to receiving a particular type of input, the data-entry fields 220 through 226 can provide information related to the particular type of input to the data-entry system 110. For example, data-entry field 220 may include a button (e.g., a web form button) that indicates whether a signature is missing from the handwritten form represented by form image 130. Responsive to receiving an "enter" keystroke or a "space" keystroke, data-entry field 220 can provide to the data-entry system 110 information indicating that signature is missing. The data-entry system 110 may perform operations related to the received information, such as generating a notification that the handwritten form will need to be resubmitted. Additionally or alternatively, the data-entry field 221 may include a form option (e.g., a checkbox, a radio button). Responsive to receiving a keystroke selecting an option, the data-entry field 221 can provide to the data-entry system 110 information indicating the chosen option. Additionally or alternatively, the data-entry fields 222 through 225 may include an area to receive alphanumeric information, such as letters, numbers, text symbols, or any other suitable alphanumeric information. Responsive to receiving alphanumeric keystrokes, the data-entry fields 222 through 225 can provide to the data-entry system 110 information indicating the entered alphanumeric information. In some aspects, a particular data-entry field may apply a formatting to the entered alphanumeric information, such as a formatting for a date, a currency, or any other suitable format. Additionally or alternatively, the data-entry fields 226 may include a menu, such as a menu having one or more options. Responsive to receiving an "arrow" keystroke, the data-entry field 226 can provide to the data-entry system 110 information indicating the chosen option. In some aspects, the data-entry fields 220 through 226 may provide the respective information further in response to an input indicating a submission of the information. For example, the data-entry fields 220 through 226 may provide the information to the data-entry system 110 in response to an input indicating a selection of a control 213 (e.g., a "submit" button).

Figure 3:
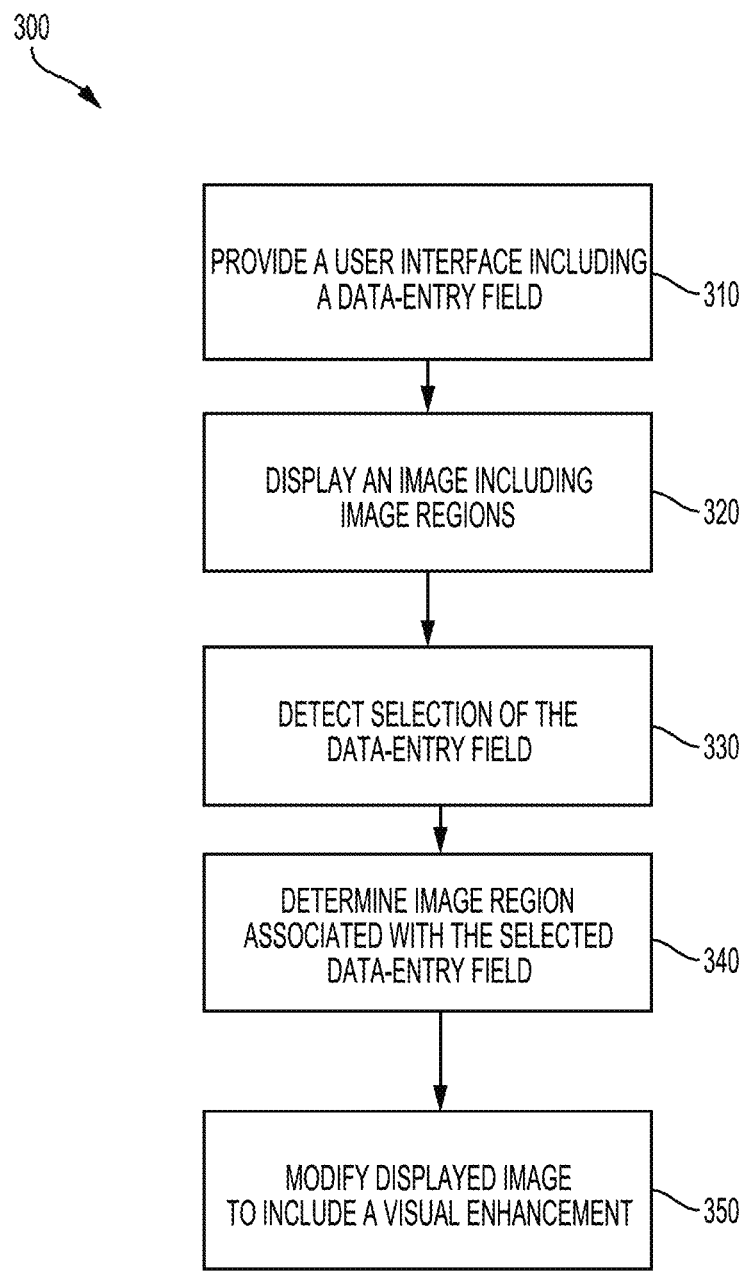
FIG. 3 is a flow chart depicting an example of a process for synchronizing, in the data-entry interface of FIG. 2, a data-entry field with a region of an image, according to certain aspects.

FIG. 3 is a flow chart depicting an example of a process 300 for synchronizing a data-entry interface with one or more regions of an image. In some aspects, such as described in regards to FIGS. 1 and 2, a data-entry system implements operations described in FIG. 3, by executing suitable program code. For illustrative purposes, the process 300 is described with reference to the examples depicted in FIGS. 1 and 2. Other implementations, however, are possible.

At block 310, the process 300 involves providing a user interface including one or more data-entry fields. For example, the data-entry system 110 can provide the data-entry interface 120. The data-entry interface 120 can include one or more data-entry fields, such as the data-entry fields 220 through 226. Additionally or alternatively, the data-entry interface 120 can include an image area 135. In some aspects, the data-entry system 110 displays the data-entry interface 120 on a display device, such as display device 116.

At block 320, the process 300 involves displaying an image including one or more image regions. In some aspects, the displayed image is a graphical image based on a scanned document, such as a document including a handwritten form. In additional aspects, the one or more image regions correspond to portions of the information included in the handwritten form. For example, a particular image region can correspond to form information regarding a signature. An additional image region can correspond to additional form information regarding a job title.

At block 330, the process 300 involves detecting a selection of a target data-entry field included in the user interface. For example, in response to receiving an input from an input device 112, the data-entry system 110 determines a selection of the data-entry field 224 as the target data-entry field.

At block 340, the process 300 involves determining an image region associated with the target data-entry field. For example, the data-entry system 110 can determine that region 234 is associated with the data-entry field 224, such as based on the metadata 140.

At block 350, the process 300 involves modifying the displayed image to include one or more visual enhancements. In some aspects, a visual enhancement is applied to the image region associated with the selected data-entry field. For example, the data-entry interface 120 may display the region 234 with the visual enhancement 250. In some additional aspects, multiple visual enhancements are applied to the image displayed in the image region 135.

In some aspects, determining the association between the image region and the selected data-entry field is based on metadata. In additional aspects, one or more of the visual enhancements are based on metadata. For example, an association between a data-entry field and an image region can be determined based on a label included in the metadata. Additionally or alternatively, a type or a location of a visual enhancement can be determined based on a set of coordinates included in the metadata. In some cases, a data-entry interface may be synchronized based on the metadata. For example, updating a data-entry interface based on metadata may show synchronization between (or a visual enhancement of) the associated data-entry field and image region. The metadata may allow the synchronized data-entry interface to be updated quickly, allowing a data-entry specialist to quickly and accurately transcribe information from multiple image regions.

FIG. 4 depicts examples of metadata that can indicate an association between a data-entry field and an image region. In some aspects, a digital file containing metadata information, such as the metadata 140, can include information, such as code, similar to some or all of the examples depicted in FIG. 4. Code included in the digital file may be implemented using any suitable programming language, such as XML, JavaScript, HTML, or any other suitable programming language.

In some aspects, the metadata 140 includes one or more field definitions, such as the field definition 410. The field definition 410 can include information describing one or more items of information included on the handwritten form. For example, if the handwritten form includes a portion of information indicating a position or title, such as information related to region 234 in FIG. 2, the field definition 410 can describe a field related to the position or title information. The field definition 410 can include a name, which can uniquely identify the field within the metadata; a label, which can indicate to a data-entry specialist the information of the field; a type, which can identify a data type that is received by the field; and a set of coordinates, which can indicate a region of the image. In some aspects, the field definition 410 can include additional information related to the field, such as a type of visual enhancement (e.g., an outline, highlighting), a location identifying where informational input may be stored (e.g., in database 180), or any other suitable information.

In some additional aspects, the metadata 140 includes one or more interface field configurations, such as the interface field configuration 450. Additionally or alternatively, the data-entry interface 120 may include the interface field configuration 450, or configuration data based on the interface field configuration 450. The interface field configuration 450 can indicate one or more actions to perform related to an associated data-entry field. For example, the interface field configuration 450 indicates an action "(onFocus)," such as an action that is performed upon receiving data that indicates a focus (e.g., a keystroke selecting a data-entry field). The interface field configuration 450 also indicates the label "Position/Title" corresponding to the label included in the field definition 410. In some aspects, responsive to receiving a selection of a data-entry field (e.g., "focusing on" the data-entry field), the data-entry system 110 will perform operations indicated by the "(onFocus)" action. For example, responsive to receiving a selection of a data-entry field that is labeled "Position/Title," the data-entry system 110 can perform operations indicated by the "(onFocus)" action associated with the label "Position/Title."

In some aspects, operations indicated by an action can operate on a field defined in the metadata. For example, the operations indicated by the "(onFocus)" action include the operation "createOutlineCommand." In the interface field configuration 450, the "createOutlineCommand" operation operates on the name "jobTitle," such as the field having the name "jobTitle" that is included in field definition 410. Responsive to the occurrence of the "(onFocus)" action, the data-entry system 110 can perform the "createOutlineCommand" operation based on information associated with the "jobTitle" field. For example, responsive to receiving an input selecting the data-entry field that is labeled "Position/Title," the data-entry system 110 can perform an outline command (e.g., a visual enhancement) based on a set of coordinates associated with the "jobTitle" field.

In some aspects, the coordinates are defined with respect to a coordinate framework that is based on the displayed image, such as a framework in which the top left corner of the form image 130 is assigned the coordinates (0, 0). In additional aspects, the coordinates are defined with respect to a coordinate framework that is based on information included in the handwritten form, such as a framework that assigns the coordinates (0, 0) to an indication (e.g., a hashmark, a calibration mark) printed onto the handwritten form.

In additional aspects, a data-entry interface may be generated based on the information included in the metadata. In some aspects, the data-entry system 110 may generate the data-entry interface 120 based on the field definition 410 and the interface field configuration 450. For example, the data-entry system 110 can generate the data-entry interface 120 such that the data area 125 displays the data-entry field 224 with a label of "Position/Title" and a data type of "text" corresponding to the label and type included in the field definition 410. Additionally or alternatively, the data-entry system 110 can generate the data-entry interface 120 such that the generated data-entry field 224 is associated with the interface field configuration 450. In some aspects, the generated data-entry interface 120 may include configuration data based on the metadata 140, such as a line of code based on the interface field configuration 450.

In some aspects, a data-entry interface may display one or more data-entry fields in a sequence different from a sequence of related information on the handwritten form. For example, a handwritten form may include a signature area near the bottom of the form. A data-entry interface related to the handwritten form may include a data-entry field associated with signature information near the beginning of the data-entry interface (e.g., data-entry field 220 displayed near the top of data area 125). A data-entry specialist may improve his or her work flow by checking for the presence of the signature before transcribing any information that is written on the handwritten form. In some aspects, the data-entry system 110 may generate the data-entry field near the beginning of the data-entry interface based on the field definition for that data-entry field, such as the location of the field definition within the metadata associated with the handwritten form.

Figure 5:
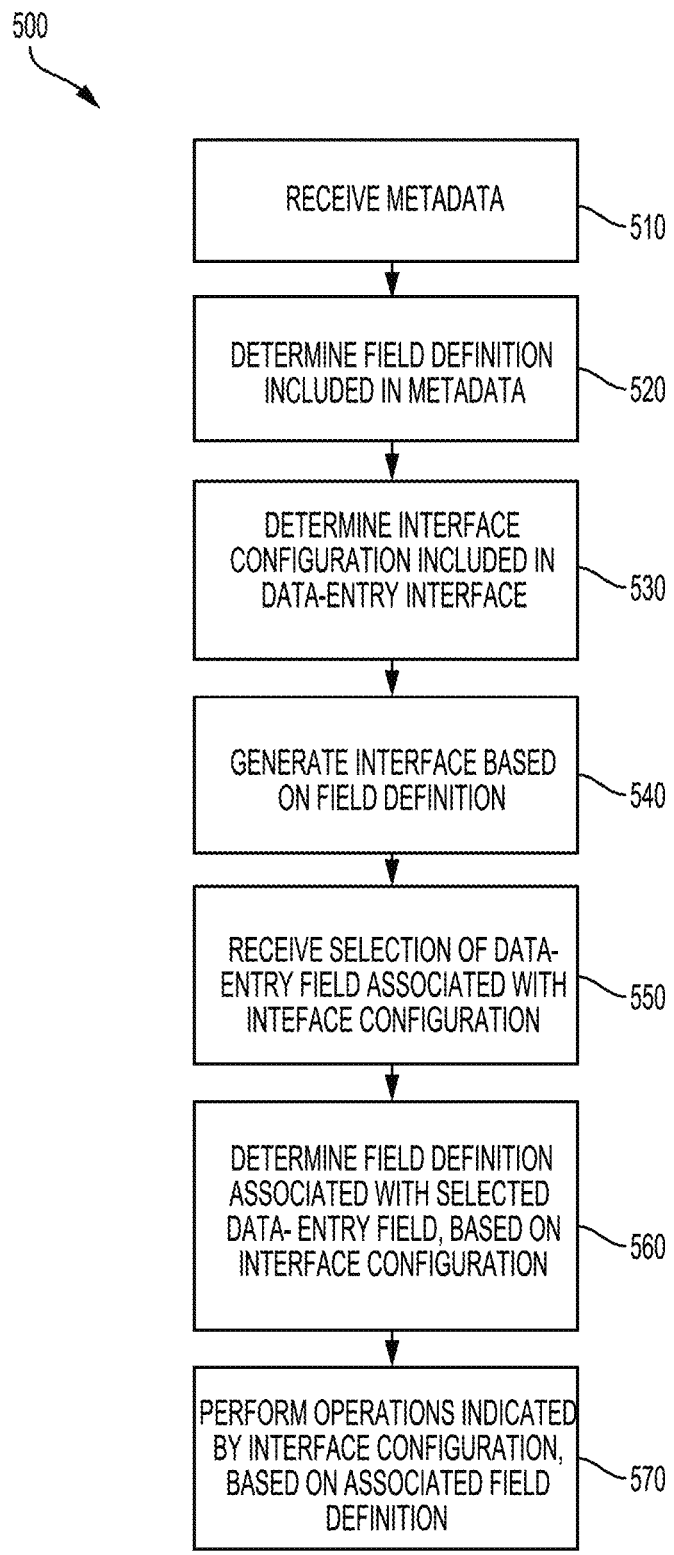
FIG. 5 is a flow chart depicting an example of a process for synchronizing an area of the data-entry interface of FIG. 2 based on the metadata of FIG. 4, according to certain aspects.

FIG. 5 is a flow chart depicting an example of a process 500 for synchronizing an area of a data-entry interface based on metadata. In some aspects, such as described in regards to FIGS. 1-4 a data-entry system implements operations described in FIG. 5, by executing suitable program code. For illustrative purposes, the process 500 is described with reference to the examples depicted in FIGS. 1-4. Other implementations, however, are possible.

At block 510, the process 500 involves receiving metadata, such as metadata 140. The data-entry system 110 can receive or access a digital file including the metadata 140. In some aspects, the metadata 140 is associated with a handwritten form. For example, if the content of a particular handwritten form is known, metadata describing the contents of the particular form is created and associated with the form. In some additional aspects, the data-entry system 110 receives the metadata 140 based on an input received. For example, a data-entry specialist using the data-entry system 110 can provide an input indicating that he or she is working with a particular handwritten form, or type of handwritten form. In response to receiving the input from the specialist, the data-entry system 110 can receive the metadata 140 associated with the indicated form.

At block 520, the process 500 involves determining one or more field definitions included in the metadata. For example, the data-entry system 110 can determine that the metadata 140 includes the field definition 410 describing a particular field. In addition, the data-entry system 110 can determine information included in the field definition 410, such as a name, a label, or a set of coordinates related to the described field.

At block 530, the process 500 involves determining one or more interface configurations included in the metadata. For example, the data-entry system 110 can determine that the metadata 140 includes the interface field configuration 450 associated with a particular field. In addition, the data-entry system 110 can determine information included in the interface field configuration 450, such as indications of actions associated with the particular field.

At block 540, the process 500 involves generating a data-entry interface based on the metadata. For example, the data-entry system 110 can generate the data-entry interface 120 based on the metadata 140. Based on the field definition 410, the data-entry interface 110 can generate an interface including the data-entry field 224. The data-entry field 224 can be associated with the interface field configuration 450. In some aspects, the data-entry system 110 generates the interface field configuration 450 during operations related to generating the data-entry interface 120. Additionally or alternatively, the data-entry system 110 receives the interface field configuration 450 with the received metadata 140, and includes information related to the interface field configuration 450 in the data-entry interface 120 (e.g., by generating code included in the interface, based on the interface field configuration 450).

In some aspects, some operations related to one or more of blocks 530 and 540 may be optional. For example, if the data-entry system 110 generates the interface field configuration 450 during generation of the data-entry interface 120, operations related to determining interface configurations included in the metadata may be omitted. Additionally or alternatively, if the data-entry system 110 has access to an existing data-entry interface 120, operations related to generating an interface based on an interface configuration may be omitted.

At block 550, the process 500 involves receiving a selection of a data-entry field associated with an interface configuration. For example, the data-entry system 110 can receive an input, via the input device 112, indicating a selection of a particular data-entry field included in the data-entry interface 120. The data-entry system 110 can determine that the particular data-entry field is associated with an interface configuration. For example, the data-entry system 110 can determine that the data-entry field 224 is associated with the interface field configuration 450. In some aspects, the data-entry system 110 can determine the association based on a shared characteristic, such as the "Position/Title" label included in the data-entry field 224 and the interface field configuration 450. In additional aspects, the data-entry system 110 can determine the association based on information included in the selected data-entry field, such as a line of code indicating the interface field configuration 450, included in code describing the data-entry field 224.

At block 560, the process 500 involves determining a field definition associated with the selected data-entry field, based on the interface configuration of the selected data-entry field. For example, the data-entry system 110 can determine that field definition 410 is associated with the data-entry field 224, based on the interface field configuration 450 associated with the data-entry field 224. In some aspects, the data-entry system 110 can determine the association based on a shared characteristic, such as the "jobTitle" label included in the interface field configuration 450 and the field definition 410.

At block 570, the process 500 involves performing one or more operations indicated by the interface configuration, based on the associated field definition. In some aspects, the one or more operations are performed based on information included in the associated field definition. For example, the data-entry system 110 can perform a "createOutlineCommand" operation related to an "(onFocus)" action indicated by the interface field configuration 450, based on the name "jobTitle" included in the associated field definition 410. In addition, the data-entry system 110 can perform the "createOutlineCommand" based on a set of coordinates included in the associated field definition 410.

In some aspects, one or more operations related to one or more of blocks 560 and 570 are performed in response to other operations included in process 500. For example, in response to operations related to receiving a selection of the data-entry field 224, as described in regards to block 550, the data-entry system 110 can perform one or more operations related to determining the associated field definition 410 and performing the "(onFocus)" action indicated by the interface field configuration 450. A data-entry specialist using the data-entry interface 120 may perceive the results of the "(onFocus)" action (e.g., creating an outline around the image region 234) promptly after selecting the data-entry field 224, such that the data-entry specialist does not perceive any delay in the results. Providing the outline or other visual enhancement responsive to the selection of the data-entry field may allow the data-entry specialist to quickly find the relevant information in the image region, and to complete any data entry and move on to the next data-entry field.

In some aspects, a data-entry specialist can use a particular input device to perform multiple operations in a synchronized data-entry interface. For example, in response to receiving multiple inputs from the input device 112, the data-entry system 110 can synchronize the data area 125 and the image area 135 included in the data-entry interface 120. In some aspects, the data-entry system 110 can synchronize a visual enhancement 250 of an image region 234 with a selected data-entry field 224, as described elsewhere herein. In additional aspects, the data-entry system 110 can synchronize the image displayed within the image area 135 with a visual enhancement that is displayed within the image area 135.

Figure 6:
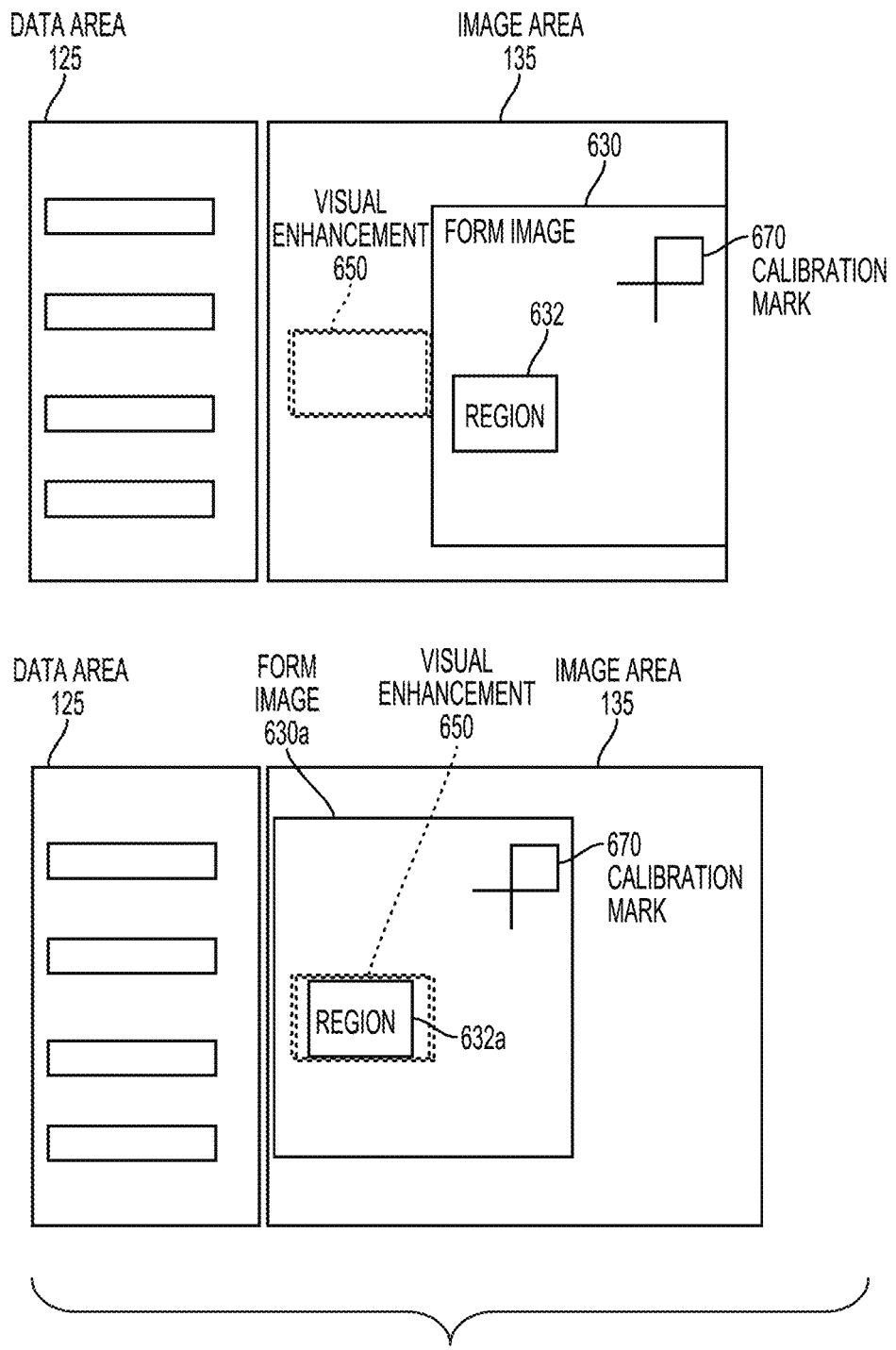
FIG. 6 is a diagram depicting an example of a data-entry interface provided by the data-entry system of FIG. 1, which is capable of capable of synchronizing an image and a visual enhancement displayed with the image, according to certain aspects.

FIG. 6 is a block diagram depicting an example of synchronization of an image and a visual enhancement displayed within a data-entry interface. For example, the data-entry system 110 may display the data area 125 and the image area 135 included in the data-entry interface 120. The data area 125 can include one or more data-entry fields, and the data-entry system 110 can receive a selection of one of the data-entry fields, as described elsewhere herein.

The data-entry system 110 can display a form image 630 and a visual enhancement 650 in the image area 135. The form image 630 can include an image region 632 that is associated with a selected one of the data-entry fields in the data area 125. However, the region 632 can be uncoordinated with the visual enhancement 650. For example, the form image 630 may include graphical information that is uncoordinated with the image area 135, such as an image that is offset from a coordinate framework included in the data-entry interface. Additionally or alternatively, the form image 630 may represent a scanned document that was scanned improperly, such as at an improper angle with respect to the scanner (e.g., skewed).

In some aspects, the data-entry system 110 can synchronize the form image 630 with the visual enhancement 650. For example, the data-entry system can perform operations to detect, on the form image 630, a calibration mark 670. The calibration mark 670 can include information that is printed on the handwritten form represented by the form image 630, such as a shape, text included on the handwritten form, a quick response code (e.g., "QR code"), or any other suitable printed information. The calibration mark 670 can indicate one or more of a location or an orientation of the form image 630. For example, the data-entry system 110 can compare the calibration mark 670 to a known location with respect to the image area 135. Based on the comparison with the known location, the data-entry system can adjust the relative location of the form image 630 within the image area 135, such that the calibration mark 670 is coordinated with the known location. In additional aspects, the data-entry system 110 can compare the calibration mark 670 to a known orientation with respect to the image area 135. Based on the comparison with the known orientation, the data-entry system can adjust the relative orientation of the form image 630 within the image area 135, such that the calibration mark 670 is coordinated with the known orientation. In some aspects, adjustments of the relative location or relative orientation of the form image 630 with respect to the image area 135 can include one or more of adjusting a relative position, a relative angle, a relative scaling factor, a relative alignment (e.g., de-skewing), or any other suitable property of the form image 630.

In some aspects, the data-entry system 110 can synchronize the form image 630 to the known location or known orientation associated with the image area 135, based on the comparison with the calibration mark 670. For example, the data-entry system 110 can determine a coordinated location and orientation of the image within the image area 135, such that the coordinated form image 630a has a coordinated position and location relative to the image area 135. Based on the coordinated form image 630a, the data-entry system 110 can synchronize the coordinated region 632a with the visual enhancement 650.

Figure 7:
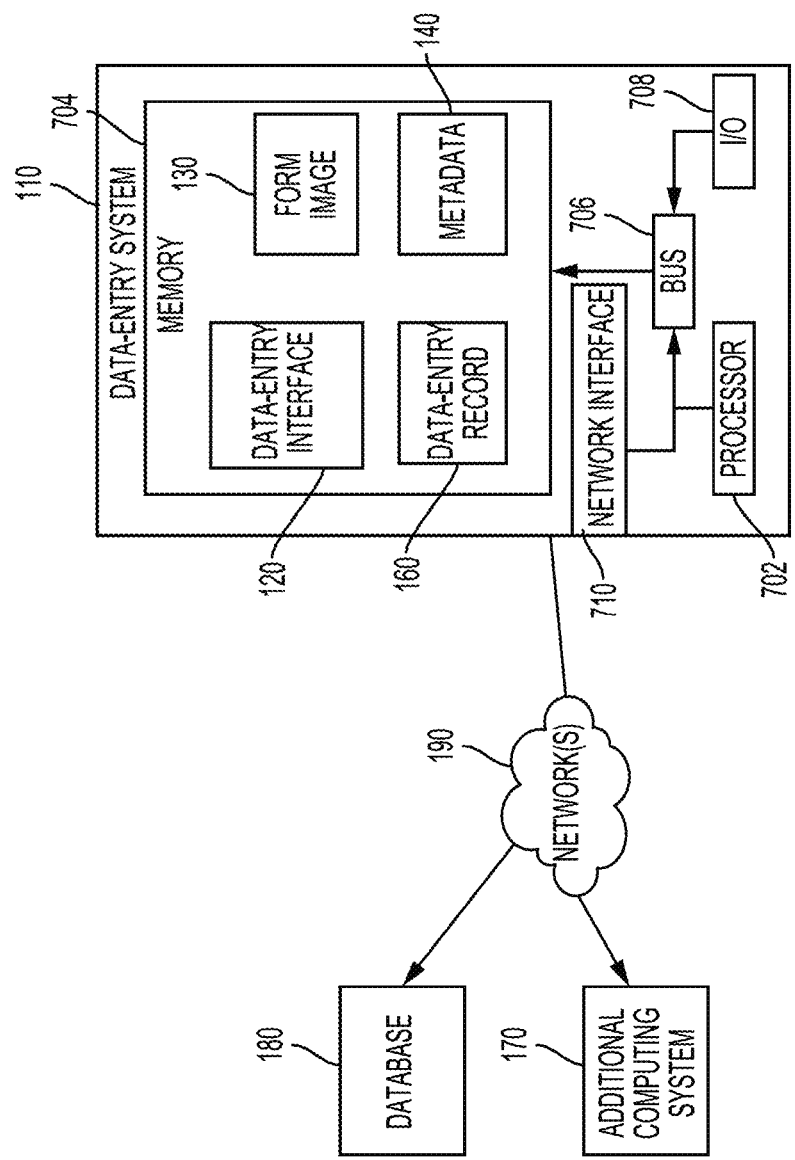
FIG. 7 is a block diagram depicting the data-entry system of FIG. 1 for synchronizing, within the data-entry interface of FIG. 2, a data-entry field with an image, according to certain aspects.

Any suitable computing system or group of computing systems can be used for performing the operations described herein. For example, FIG. 7 is a block diagram depicting a data-entry system capable of synchronizing areas of a user interface, according to certain aspects.

The depicted example of a data-entry system 110 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the data-entry interface 120, the form image 130, the metadata 140, the data-entry record 160, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The data-entry system 110 may also include a number of external or internal devices such as input or output devices. For example, the data-entry system 110 is shown with an input/output ("I/O") interface 708 that can receive input from input devices, such as input device 112 or input device 114, or provide output to output devices, such as display device 116. A bus 706 can also be included in the data-entry system 110. The bus 706 can communicatively couple one or more components of the data-entry system 110.

The data-entry system 110 executes program code that configures the processor 702 to perform one or more of the operations described above with respect to FIGS. 1-6. The program code includes operations related to, for example, one or more of the data-entry interface 120, the form image 130, the metadata 140, the data-entry record 160, or other suitable applications or memory structures that perform one or more operations described herein. The program code may be resident in the memory device 704 or any suitable computer-readable medium and may be executed by the processor 702 or any other suitable processor. In some aspects, the program code described above, the data-entry interface 120, the form image 130, the metadata 140, and the data-entry record 160 are stored in the memory device 704, as depicted in FIG. 7. In additional or alternative aspects, one or more of the data-entry interface 120, the form image 130, the metadata 140, the data-entry record 160, and the program code described above are stored in one or more memory devices accessible via a data network, such as a memory device accessible via a cloud service.

The data-entry system 110 depicted in FIG. 7 also includes at least one network interface 710. The network interface 710 includes any device or group of devices suitable for establishing a wired or wireless data connection to one or more data networks 190. Non-limiting examples of the network interface 710 include an Ethernet network adapter, a modem, and/or the like. An additional computing system 170 is connected to the data-entry system 110 via network 190, and the additional computing system 170 can perform some of the operations described herein, such as providing or modifying the form image 130. A database 180 is connected to the data-entry system 110 via network 190, and the database 180 can receive or provide some of the operations described herein, such as providing images of scanned forms or receiving transcribed information entered into the data-entry record 160. The data-entry system 110 is able to communicate with one or more of the additional computing system 170 and the database 180 using the network interface 190.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "operating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   receiving an image of a document, the image including regions, wherein each region of the image displays a portion of information from the document as represented by the image;
   receiving metadata associated with the image;
   generating, based on the received metadata, a data-entry interface including data-entry fields and a displayed image that is based on the received image;
   detecting, on the image of the document, a calibration mark indicating a coordinate framework of the displayed image;
   detecting, by a processing device, a selection of a target data-entry field from the data-entry fields;
   determining, by the processing device and based on detecting the selection, an associated region from the regions, wherein the associated region corresponds to the target data-entry field; and
   modifying, by the processing device, the displayed image in the data-entry interface to include a visual enhancement of the associated region from the image of the document.

2. The method of claim 1, further comprising, subsequent to detecting the selection of the target data-entry field:
   receiving an input associated with the target data-entry field; and
   providing the received input to a data-entry record.

3. The method of claim 1, further comprising:
   receiving an input associated with one or more of: the target data-entry field or a control included on the data-entry interface; and
   in response to detecting the input, further modifying the displayed image to include an additional visual enhancement.

4. The method of claim 1, wherein a portion of the received metadata indicates one or more of:
   the associated region, or
   the visual enhancement of the associated region.

5. The method of claim 1, wherein modifying the displayed image in the data-entry interface further comprises:
   determining one or more of a relative location or a relative orientation of the displayed image with respect to the data-entry interface; and synchronizing the displayed image and the visual enhancement, wherein the synchronizing is based on the one or more of the relative location or the relative orientation.

6. The method of claim 1, wherein the received metadata includes a set of coordinates associated with the target data-entry field,
the method further comprising determining a location of the visual enhancement based on the set of coordinates.

7. The method of claim 6,
wherein the set of coordinates associated with the target data-entry field are determined with respect to the coordinate framework of the displayed image.

8. A non-transitory computer-readable medium embodying program code, the program code comprising instructions which, when executed by a processor, cause the processor to perform operations including:
receiving an image of a document, the image including regions, wherein each region of the image displays a portion of information from the document as represented by the image;
receiving metadata associated with the image;
generating, based on the received metadata, a data-entry interface including data-entry fields and a displayed image that is based on the received image;
detecting, on the image of the document, a calibration mark indicating a coordinate framework of the displayed image;
detecting a selection of a target data-entry field from the data-entry fields;
determining, based on detecting the selection, an associated region from the regions, wherein the associated region corresponds to the target data-entry field; and
modifying the displayed image in the data-entry interface to include a visual enhancement of the associated region from the image of the document.

9. The non-transitory computer-readable medium of claim 8, the operations further including, subsequent to detecting the selection of the target data-entry field:
receiving an input associated with the target data-entry field; and
providing the received input to a data-entry record.

10. The non-transitory computer-readable medium of claim 8, the operations further including:
receiving an input associated with one or more of: the target data-entry field or a control included on the data-entry interface; and
in response to detecting the input, further modifying the displayed image to include an additional visual enhancement.

11. The non-transitory computer-readable medium of claim 8, wherein a portion of the received metadata indicates one or more of:
the associated region, or
the visual enhancement of the associated region.

12. The non-transitory computer-readable medium of claim 8, wherein modifying the displayed image in the data-entry interface further comprises:
determining one or more of a relative location or a relative orientation of the displayed image with respect to the data-entry interface; and
synchronizing the displayed image and the visual enhancement, wherein the synchronizing is based on the one or more of the relative location or the relative orientation.

13. The non-transitory computer-readable medium of claim 12, wherein the received metadata includes a set of coordinates associated with the target data-entry field,
the operations further including determining a location of the visual enhancement based on the set of coordinates.

14. The non-transitory computer-readable medium of claim 13,
wherein the set of coordinates associated with the target data-entry field are determined with respect to the coordinate framework of the displayed image.

15. A data-entry system comprising:
a processor;
a display device configured for being controlled by the processor: and
a non-transitory computer-readable storage device comprising instructions that are executable by the processor for:
receiving an image of a document, the image including regions, wherein each region of the image displays a portion of information from the document as represented by the image;
receiving metadata associated with the image;
generating, based on the received metadata, a data-entry interface including data-entry fields and a displayed image that is based on the received image;
detecting, on the image of the document, a calibration mark indicating a coordinate framework of the displayed image;
detecting a selection of a target data-entry field from the data-entry fields;
determining, based on detecting the selection, an associated region from the regions, wherein the associated region corresponds to the target data-entry field; and
modifying the displayed image in the data-entry interface to include a visual enhancement of the associated region from the image of the document.

16. The data-entry system of claim 15, the instructions further comprising, subsequent to detecting the selection of the target data-entry field:
receiving an input associated with the target data-entry field; and
providing the received input to a data-entry record.

17. The data-entry system of claim 15, the instructions further comprising:
receiving an input associated with one or more of: the target data-entry field or a control included on the data-entry interface; and
in response to detecting the input, further modifying the displayed image to include an additional visual enhancement.

18. The data-entry system of claim 15, wherein modifying the displayed image in the data-entry interface further comprises:
determining one or more of a relative location or a relative orientation of the displayed image with respect to the data-entry interface; and
synchronizing the displayed image and the visual enhancement, wherein the synchronizing is based on the one or more of the relative location or the relative orientation.

19. The data-entry system of claim 15, wherein the received metadata includes a set of coordinates associated with the target data-entry field,
the instructions further comprising determining a location of the visual enhancement based on the set of coordinates.

20. The data-entry system of claim 19, wherein the set of coordinates associated with the target data-entry field are determined with respect to the coordinate framework of the displayed image.

* * * * *